March 1, 1949.  A. B. BROLUSKA  2,463,352
JET POWER MEANS FOR AIRCRAFT
Filed May 1, 1944  4 Sheets-Sheet 1

INVENTOR.
Amel Ben Broluska

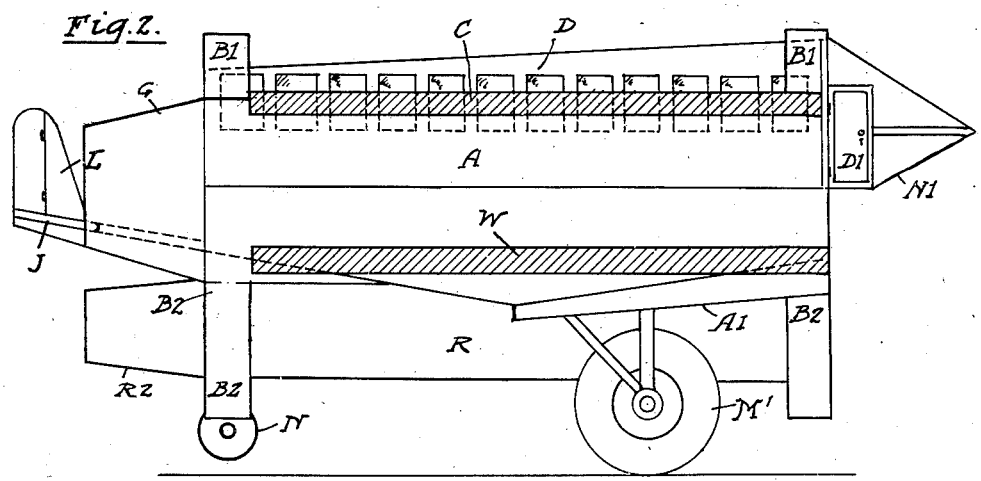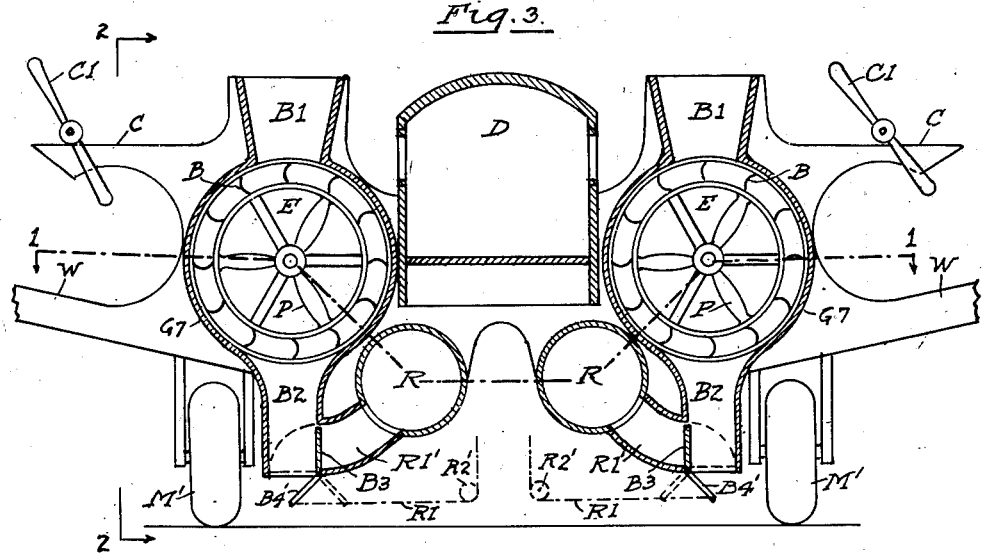

March 1, 1949.  A. B. BROLUSKA  2,463,352
JET POWER MEANS FOR AIRCRAFT
Filed May 1, 1944  4 Sheets-Sheet 3

INVENTOR.
Amel B. Broluska

March 1, 1949. A. B. BROLUSKA 2,463,352
JET POWER MEANS FOR AIRCRAFT
Filed May 1, 1944 4 Sheets-Sheet 4
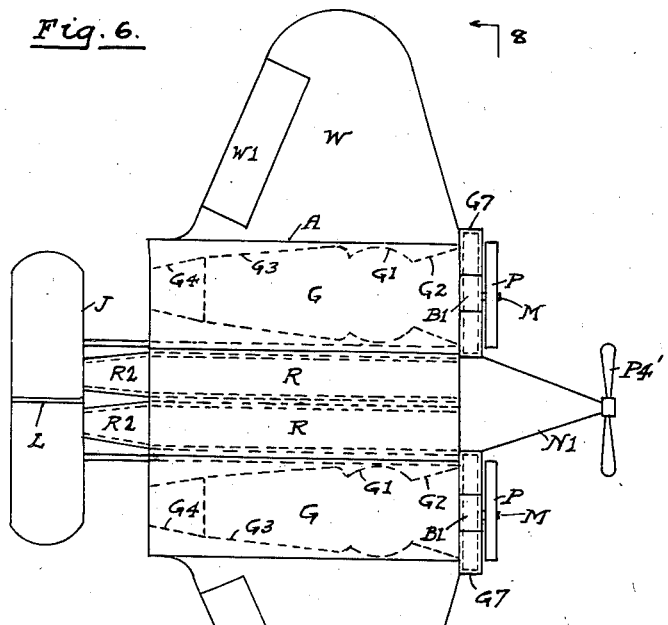
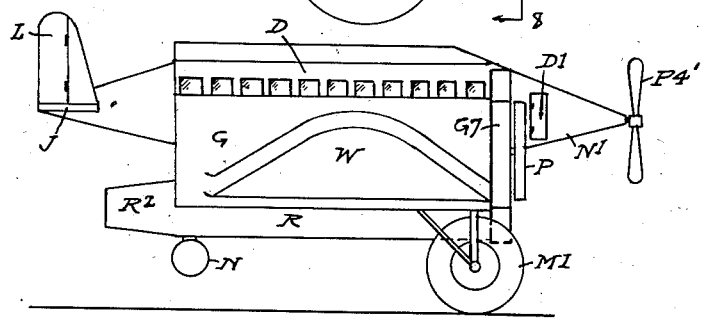
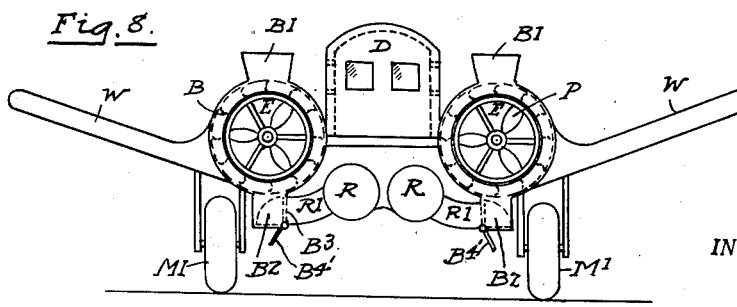
INVENTOR.
Arnel Ben Broluska Patented Mar. 1, 1949

2,463,352

UNITED STATES PATENT OFFICE 2,463,352

JET POWER MEANS FOR AIRCRAFT

Amel Ben Broluska, Detroit, Mich.

Application May 1, 1944, Serial No. 533,581

7 Claims. (Cl. 244—23)

My invention relates to aircraft in general and more particularly to a jet power means for aircraft to provide horizontal propulsive forces as well as vertical lifting forces.

It is the object of this invention to provide a horizontally disposed tube open at both ends and having an air impeller mounted coaxially thereof for propelling air axially therethrough for obtaining a horizontal propulsive effect.

It is the object of this invention to provide within said tube an annular outwardly projecting portion with upwardly formed air intake means at the top and a downwardly facing air discharge means at the bottom, with a vaned wheel in said annular portion for displacing air from said intake means to said discharge means whereby a vertical lifting force is effected by the reaction of the downwardly projecting air jet.

It is the object of this invention to operate said impeller separately or simultaneously with said vaned wheel, or on the other hand to operate said vaned wheel separately, for producing the separate or combined effects of said impeller and vaned wheel.

It is the further object of this invention to provide a secondary horizontally disposed tube joined to said discharge means whereby upon operation of an interposed valve element, the discharged air from said vaned wheel and downwardly facing discharge means can be by-passed through said secondary tube to produce a secondary horizontal propulsive effect rather than a lifting effect.

These and other objects will be seen from the drawings and specification in conjunction with the claims herein. In said drawings:

Figure 2 is an elevational section thereof on line 2—2 of Figure 3.

Figure 3 is a fragmentary front elevational section taken on line 3—3 of Figure 1.

Figure 6 is a plan view with a dotted line indication of an embodiment of the invention as applied to a pursuit plane or the like.

Figure 7 is a side elevational view thereof; and

Figure 8 is an elevational view on line 8—8 of Figure 6.

It will be understood that the above drawings illustrate merely preferable embodiments of the invention, and that other embodiments are contemplated within the scope of the claims hereafter set out.

Figure 1:
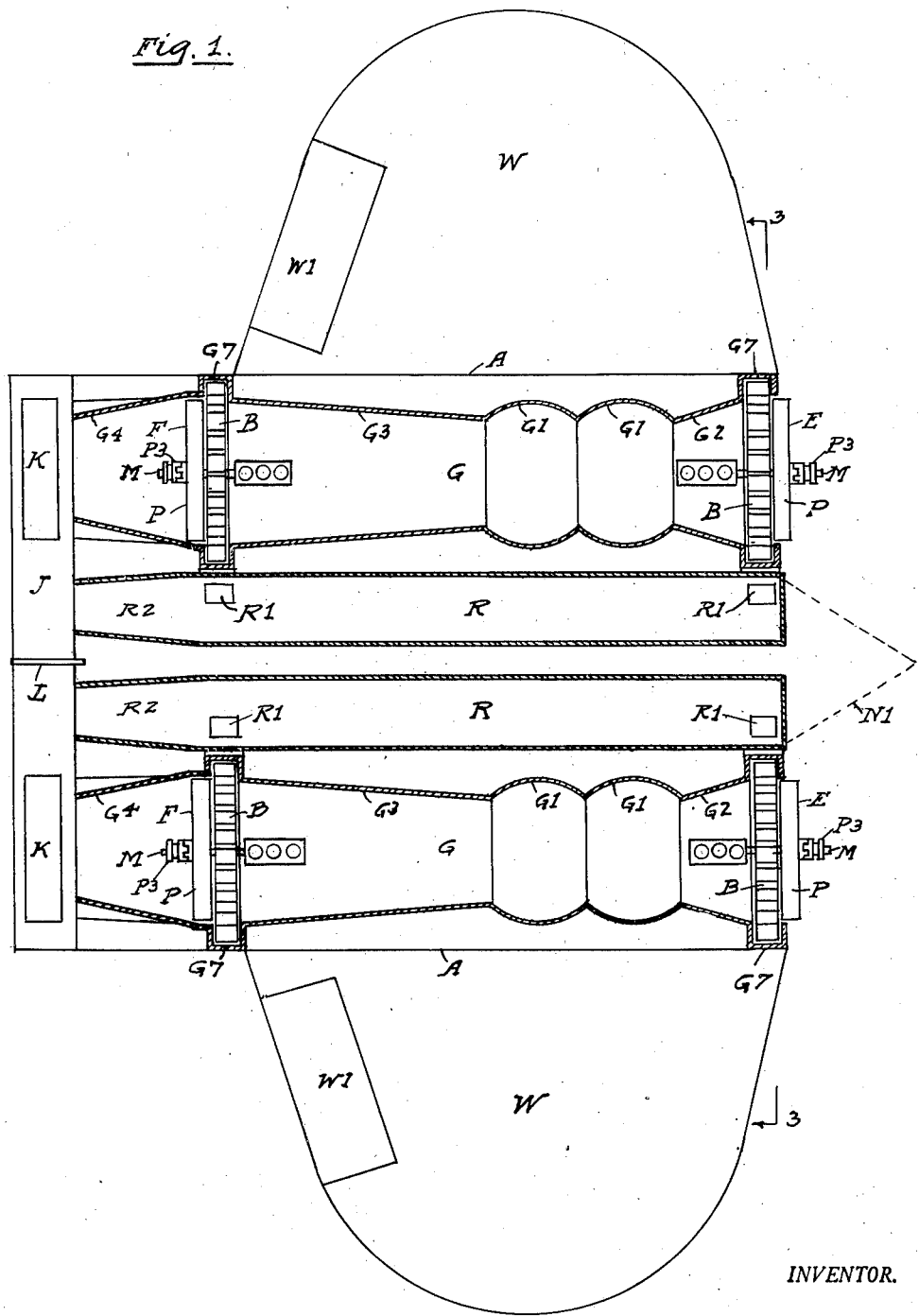
Figure 1 is a plan section of the aircraft on line 1—1 of Figure 3.

Referring to the drawing, Figures 1 to 3, airplane body A has a pair of low type wings W and a pair of stabilizer wings C, between which is mounted cabin D.

Air impeller units E and F are respectively positioned adjacent the front and rear portions of cabin D, though impeller units F may be omitted if desired, as illustrated in the embodiment shown in Figure 6.

A pair of open ended horizontally arranged tubes G are positioned within body A upon opposite sides of cabin D permitting the passage of air therethrough as the plane moves horizontally in the manner hereafter described, as well as permitting the passage of air forced therethrough by impeller units E and F.

Tubes G are irregularly formed as shown in Figure 1 and include arcuate enlargements G1 and the tapering portions G2, G3 and G4, which have a desirable effect upon the air passing therethrough. It will be recognized that the variation in diameter of the air passages forming a part of tube G will produce variations in the pressure and velocity of the air jet passing through said tubes.

Propeller units E are preferably provided adjacent the open ends of said tubes, while vaned vertical lifting elements B or blowers are positioned within said tubes adjacent their ends to operate in the manner hereafter fully described.

Below cabin D as in Figure 3 are preferably a pair of spaced horizontally extending tubes R whose leading ends are joined by passages R1 to the discharge means B2 of the blower units B. Valves B3 are interposed for by-passing the discharged air through tubes R, and through their tapered open ended trailing portions R2 to obtain additional horizontal propulsive effects, in the place of the vertical lifting effect normally produced by discharge means B2.

As shown in Figure 3 air propellers P are arranged within impeller units E to discharge air through tubes G for effecting reactive horizontal propulsive forces producing forward motion.

Figure 5:
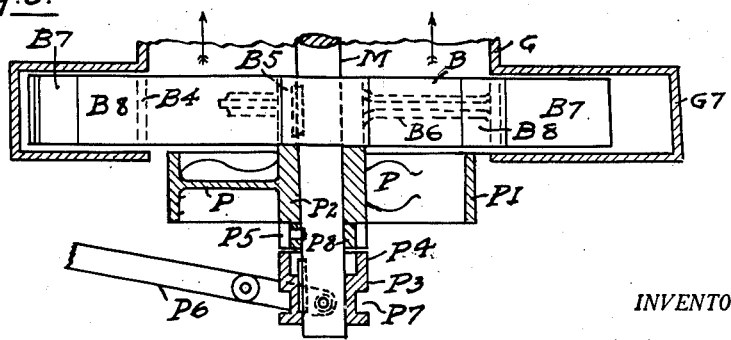
Figure 5 is a plan section on line 5—5 of Figure 4.

The vaned wheels B4 shown in Figure 5 with vaned elements B7 and B8 are rotatively mounted within the annular outwardly projecting portions G7 which are interposed within and form a part of horizontal tubes G, being preferably positioned adjacent the respective propeller units E and F.

Wheels B4 are adapted on rotation to draw air through the upwardly facing air intake means B1 and discharge the same downwardly through the downwardly facing air discharge means B2 whereby the reaction of the downwardly projecting air jet produces a substantial vertical lifting force upon the plane.

It is contemplated that after the desired altitude has been attained, this lifting force may be changed over to a secondary horizontal propulsive force by actuation of levers B4' controlling valves B3.

In the dotted line position of valves B3 the vertical discharge opening in discharge means B2 is closed, and the air from vaned elements B4 is forced through conduits R1 and into the forward portions of secondary tubes R. In this connection it will be noted that the rearwardly positioned blower means G7 on actuation of similar valves B3 are adapted to by-pass the air flow into the secondary rearwardly positioned conduits R1 which are positioned nearer the trailing ends of tubes R.

The open ended trailing portions R2 of said tubes discharge the air at an increased velocity due to the constriction therein, and the reaction of said horizontal air jets effects additional horizontal propulsive forces.

Figure 4:
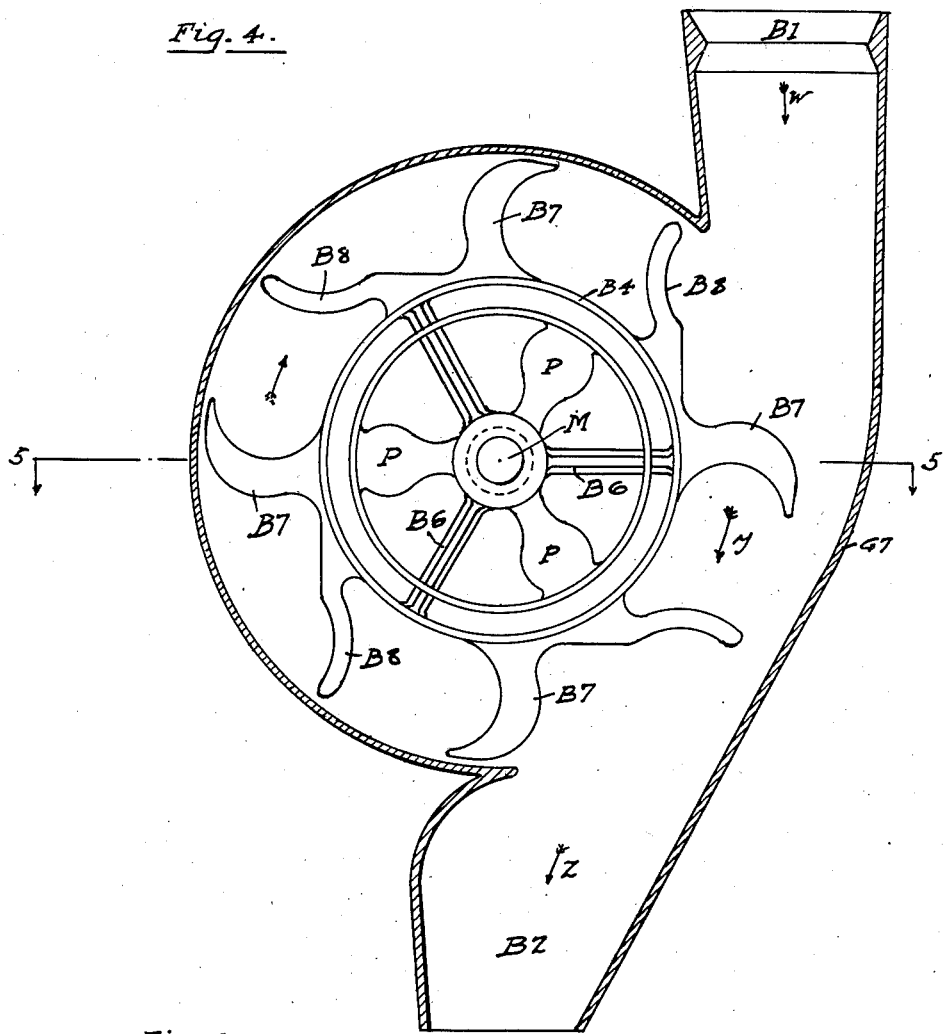
Figure 4 is an enlarged elevational section showing the air impeller, the annular outwardly projecting portion of the horizontal tube, and the vaned wheel therein.

Referring to Figures 4 and 5 the vaned wheel B4 with hub B5 and interconnecting spokes B6 are mounted upon and keyed to motor shaft M for rotation therewith at all times. Vanes B7 and B8 draw air in through air intake means B1 and discharge the same downwardly through the discharge means B2.

A propeller unit P is coaxially positioned relatively to blower units B as shown in Figures 1 and 5, and includes the rim P1 and hub P2 loosely journalled upon motor shaft M. Propeller unit P is retained against longitudinal movement on shaft M by the collar P8 and is adapted to be releasably engaged by shaft M by means of the jaw clutch P3 slidably keyed to said shaft. Inwardly projecting teeth P4 are adapted to selectively project between the corresponding teeth P5 on propeller hub P2.

Lever P6 Figure 5 is pivotally mounted intermediate its ends, while its lower end is adapted to loosely engage clutch P3 by means of the annular groove P7 therein.

Operation of clutch lever P6 will thus effect operative engagement of propeller P2 with shaft M for rotation therewith. Conversely it is seen that the horizontal propulsive effect of said propeller P will be cut off upon disengagement of clutch P3 upon the reverse operation of lever P6.

However with clutch P3 engaged, a horizontal propulsive effect is produced by the stream of air delivered horizontally through tubes G in response to the rotative motion of said propellers.

A secondary horizontal propulsive effect is attained by actuating wires R1' on pulleys R2' to close valves B3, whereby the discharged air in elements B2 is delivered through conduits R1 and subsequently through the horizontal tubes R.

The usual vertical and horizontal rudders L and J are employed, the latter having hinged flaps K Figure 1 which operate in a well known manner. Also landing wheels M1 and N are furnished, and in order to reduce the drag on the body A, its lower surfaces have inclined portions A1 thereon as illustrated in Figure 2.

In Figures 6, 7 and 8 of the drawings a modification is shown for aircraft of the lighter type, such as a pursuit plane. It will be noted however, that the stabilizer wings C of Figure 3 have been omitted. In addition a standard type propeller P—4' is mounted upon the front of conical nose N1, while the combined air impeller and blower units P and G7 respectively are arranged on the front ends only of the tubes G.

It will be noted in Figures 4 and 5 of the drawing that the propeller blades P and spokes B6 of the vaned wheel B4 are shown out of line for the sake of clarity, however in practice it is desirable that said blades and spokes be arranged in alignment, and to this end the clutch teeth P4 are so arranged.

It is seen that a substantial vertical lifting force is effected by the reaction of the downwardly projecting air jet through the discharge openings B2 of member B7. It follows further that a suction is created at the inlet of the upwardly facing air intake means B1, which thereby creates an additional cooperating vertical lifting force.

Having thus described my said invention, what I claim and desire to secure by Letters Patent of the United States is:

1. Jet power means for aircraft, comprising a horizontally disposed tube open at both ends, a rotary air impeller mounted co-axially within said tube and arranged to propel air axially through said tube, said tube having a substantially annular outwardly projecting portion, said annular portion having an upwardly facing air intake means at the top and a downwardly facing air discharge means at the bottom, a vaned wheel mounted in said annular portion for displacing air from said intake means to said discharge means, a drive shaft disposed axially within said tube and drivingly engaging said vaned wheel, and means for releasably engaging said impeller in driven relation to said drive shaft, whereby horizontal propulsive forces may be effected by the reaction of the air jet discharged from the tube and vertical lifting forces may be effected by the reaction of the air jet discharged from said downwardly facing discharge means.

2. Jet power means for aircraft, comprising a horizontally disposed tube open at both ends, a rotary air impeller mounted co-axially of said tube and arranged to propel air axially through said tube, said tube having a substantially annular outwardly projecting portion, said annular portion having an upwardly facing air intake means at the top and a downwardly facing air discharge means at the bottom, a vaned wheel mounted in said annular portion for displacing air from said intake means to said discharge means, a drive shaft disposed axially within said tube and drivingly engaging said vaned wheel, and means for releasably engaging said impeller in driven relation to said drive shaft, whereby horizontal propulsive forces may be effected by the reaction of the air jet discharged from the tube and vertical lifting forces may be effected by the reaction of the air jet discharged from said downwardly facing discharge means.

3. Jet power means for aircraft, comprising a horizontally disposed tube open at both ends, a rotary air impeller mounted co-axially of said tube and arranged to propel air axially through said tube, said tube having a substantially annular outwardly projecting portion, said annular portion having an upwardly facing air intake means at the top and a downwardly facing air discharge means at the bottom, a vaned wheel mounted in said annular portion for displacing air from said intake means to said discharge means, and a drive shaft disposed axially within said tube and drivingly engaging said vaned wheel and said impeller, whereby horizontal propulsive forces may be effected by the reaction of the air jet discharged from the tube and vertical lifting forces may be effected by the reaction of the air jet discharged from said downwardly facing discharge means.

4. Jet power means for aircraft, comprising a horizontally disposed tube open at both ends, a rotary air impeller mounted co-axially within said tube and arranged to propel air axially through said tube, said tube having a substantially annular outwardly projecting portion, said annular portion having an upwardly facing air intake means at the top and a downwardly facing air discharge means at the bottom, a vaned wheel mounted in said annular portion for displacing air from said intake means to said discharge means, a drive shaft disposed axially within said tube and drivingly engaging said vaned wheel, means for releasably engaging said impeller in driven relation to said drive shaft, whereby horizontal propulsive forces may be effected by the reaction of the air jet discharged from the tube and vertical lifting forces may be effected by the reaction of the air jet discharged from said downwardly facing discharge means, a secondary horizontally disposed tube joined to said air discharge means, and valve means in said discharge means adapted to selectively by-pass the discharged air through said secondary tube, whereby secondary horizontal propulsive forces may be effected by the reaction of the air jet discharged from said secondary tube.

5. Jet power means for aircraft, comprising a horizontally disposed tube open at both ends, a rotary air impeller mounted co-axially within said tube and arranged to propel air axially through said tube, said tube having a substantially annular outwardly projecting portion, said annular portion having an upwardly facing air intake means at the top and a downwardly facing air discharge means at the bottom, a vaned wheel mounted in said annular portion for displacing air from said intake means to said discharge means, a drive shaft disposed axially within said tube and drivingly engaging said vaned wheel, means for releasably engaging said impeller in driven relation to said drive shaft, whereby horizontal propulsive forces may be effected by the reaction of the air jet discharged from the tube and vertical lifting forces may be effected by the reaction of the air jet discharged from said downwardly facing discharge means, a secondary horizontally disposed tube having a converging trailing open end, said latter tube being joined to said air discharge means, and valve means in said discharge means adapted to selectively by-pass the discharged air through said secondary tube, whereby secondary horizontal propulsive forces may be effected by the reaction of the air jet discharged from said secondary tube.

6. Jet power means for aircraft, comprising a horizontally disposed tube open at both ends, a rotary air impeller mounted co-axially within said tube and arranged to propel air axially through said tube, said tube having a substantially annular outwardly projecting portion, said annular portion having an upwardly facing air intake means at the top and a downwardly facing air discharge means at the bottom, a vaned wheel mounted in said annular portion for displacing air from said intake means to said discharge means, a drive shaft disposed axially within said tube and drivingly engaging said vaned wheel, means for releasably engaging said impeller in driven relation to said drive shaft, whereby horizontal propulsive forces may be effected by the reaction of the air jet discharged from the tube and vertical lifting forces may be effected by the reaction of the air jet discharged from said downwardly facing discharge means, a secondary horizontally disposed tube with a trailing converging open end, means interconnecting the latter tube with said air discharge means, and valve means intermediate said discharge means and said interconnecting means adapted to selectively by-pass the discharged air through said secondary tube, whereby secondary horizontal propulsive forces may be effected by the reaction of the air jet discharged from said secondary tube.

7. Jet power means for aircraft, comprising an annular tube having a horizontal axis, said tube having an upwardly facing air intake means at the top and a downwardly facing air discharge means at the bottom, a vaned wheel mounted in said tube for displacing air from said intake means to said discharge means, a drive shaft disposed axially within said tube and drivingly engaging said vaned wheel, whereby vertical lifting forces may be effected by the reaction of the air jet discharged from said downwardly facing discharge means, a horizontal disposed tube with a trailing open end, means interconnecting the latter tube with said air discharge means, and valve means intermediate said discharge means and said interconnecting means adapted to selectively by-pass the discharged air through said horizontal tube, whereby horizontal propulsive forces may be effected by the reaction of the air jet discharged from said horizontal tube.

AMEL BEN BROLUSKA.

REFERENCES CITED

The following references are of record in the file of this patent:

UNITED STATES PATENTS

| Number | Name | Date |
|---|---|---|
| 51,321 | Kendrick | Dec. 5, 1865 |
| 989,455 | Wadsworth | Apr. 11, 1911 |
| 1,039,025 | Carroll | Sept. 17, 1912 |
| 1,735,115 | Higgins | Nov. 12, 1929 |
| 1,773,625 | Kunicke | Aug. 19, 1930 |
| 1,802,882 | Chappedelaine | Apr. 28, 1931 |
| 2,111,318 | Droz | Mar. 15, 1938 |
| 2,118,052 | Odor | May 24, 1938 |

FOREIGN PATENTS

| Number | Country | Date |
|---|---|---|
| 227,702 | Germany | Oct. 27, 1910 |